United States Patent [19]

Dubuisson et al.

[11] Patent Number: 4,796,210

[45] Date of Patent: Jan. 3, 1989

[54] METHOD OF DISPLAYING THE SPEED AND DISTANCE ON BOARD A MOTOR VEHICLE

[75] Inventors: Georges Dubuisson, Orgeval; Tan Duc Huynh, Champs sur Marne, both of France

[73] Assignee: Veglia, Paris, France

[21] Appl. No.: 882,187

[22] Filed: Jul. 7, 1986

[30] Foreign Application Priority Data

Jul. 5, 1985 [FR] France .................. 84 10296

[51] Int. Cl.$^4$ .................................................. G01P 3/44
[52] U.S. Cl. ........................... 364/565; 364/424.01; 324/163; 318/310
[58] Field of Search ............. 364/424, 426, 565; 324/160, 161, 163, 166, 167; 318/41, 326, 310

[56] References Cited

U.S. PATENT DOCUMENTS

| | | | |
|---|---|---|---|
| 4,074,196 | 2/1978 | Webster | 324/166 |
| 4,199,719 | 4/1980 | Grob | 324/166 |
| 4,227,150 | 10/1980 | Widl | 324/175 |
| 4,228,396 | 10/1980 | Palombo et al. | 324/163 |
| 4,323,976 | 4/1982 | Radaelli et al. | 364/565 |
| 4,506,216 | 3/1985 | Fukamachi et al. | 324/166 |
| 4,535,288 | 8/1985 | Vitulli, Jr. | 324/161 |
| 4,633,423 | 12/1986 | Bailey | 364/571 |

FOREIGN PATENT DOCUMENTS 2292981 6/1976 France .
2423786 11/1979 France .

*Primary Examiner*—Parshotam S. Lall
*Assistant Examiner*—Thomas G. Black
*Attorney, Agent, or Firm*—Stevens, Davis, Miller & Mosher

[57] ABSTRACT

A method is provided for displaying the speed and the distance on board a motor vehicle. The shaft of an auxiliary motor drives a speed indicator and a mileage recorder and its rotation controls a train of pulses. The speed of rotation of the auxiliary motor is controlled so that the period of the train of pulses and the total number of pulses are slaved respectively to the period of another train of pulses and to their total number, this other train of pulses being controlled by the rotation of one of the wheels of the vehicle.

4 Claims, 2 Drawing Sheets

METHOD OF DISPLAYING THE SPEED AND DISTANCE ON BOARD A MOTOR VEHICLE

BACKGROUND OF THE INVENTION

1. Field of the Invention

The present invention relates to a method of displaying the speed and distance on board a motor vehicle, generally implemented by means of an electronic device which avoids having a mechanical connection between the speed sensor with which one of the wheels of the vehicle is provided and the device displaying the speed and the distance covered, namely the speedometer and the mileage recorder with which the dashboard is provided. In general, the speedometer and mileage recorder are of conventional type, that is to say whose input member is a rotary shaft on which a small electric motor, or auxiliary motor, is installed controlled by the electronic device.

2. Description of the Prior Art

Such a method is already known in which a first period of recurrence of a train of pulses controlled by rotation of one of the wheels of the vehicle is determined, a second period of recurrence of a train of pulses is determined controlled by the rotation of the shaft of the auxiliary motor, connected to a device displaying the rotational speed of said shaft, and a totalizer totalling the number of revolutions of said shaft from putting the vehicle on the road, the product of said first period multiplied by a factor depending on the development or size of the wheel is determined, the difference between said second period and said product is determined, the rotational speed of the auxiliary motor is controlled so that it is proportional to the preceding difference.

This method is put into practice by means of an electronic device which forms a loop slaving the second period to the product of a first period by the factor of multiplication dependent on the wheel development or size.

In other words, the rotational speed of the auxiliary motor is made dependent on the rotational speed of the wheel, the factor of multiplication apart.

It is known that real servo control loops are imperfect, in particular insofar as their response time is concerned. Thus, a very rapid variation of the rotational speed of the wheel will only be imperfectly recopied by a variation of the rotational speed of the auxiliary motor, at least during the first moments. The result is that the value of the speed displayed by the speed indicator during sudden acceleration or deceleration phases does not correspond to the true value of the speed. This forms not in itself a considerable disadvantage and may be tolerated, to the extent that, although it is important to know accurately the speed of the vehicle in the phases, where this speed is relatively stable, it is not very serious to have only approximate knowledge thereof when accelerating or braking.

However, a serious consequence of the existence of a time response of the servo control loop is that the distance recorder which totalizes the number of revolutions of the output shaft of the auxiliary motor, does not indicate a number of kilometers strictly equal to that really covered. Thus, since the auxiliary motor does not rotate fast enough in the sudden acceleration phases, the number of additional kilometers indicated during these phases is less than the number of additional kilometers actually covered; on the other hand, in the sudden deceleration phases, the auxiliary motor rotates too fast and the number of additional kilometers indicated is greater than the number of additional kilometers actually covered. Unfortunately, the accelerations and decelerations are such that there is no compensation and the total number of kilometers displayed by the mileage recorder is not equal to the total number of kilometers actually covered.

SUMMARY OF THE INVENTION

The present invention overcomes this drawback. For this its object is a method of displaying the speed and the distance on board a motor vehicle of the above defined type, wherein:

a first number of said pulses controlled by the rotation of said wheel is counted from start up of the vehicle, a second number of said pulses controlled by the rotation of said shaft of the auxiliary motor is counted from start up of the vehicle, periodically, the quotient of said first number divided by a factor dependent on the development or size of said wheel is determined, the difference between said second number and said quotient is determined, and a variation of said multiplication factor is ordered, of the same sign as the preceding difference.

In the method of the invention, a second loop is provided for slaving the second number to the quotient of the first number divided by the factor dependent on the development or size of the wheel. It is thus certain that the number of revolutions of the auxiliary motor, slaved to the number of revolutions of the wheel, apart from the factor of division, is indeed representative of the number of kilometers actually covered, at least after a travel time greater than or equal to the response time of the second servo control loop.

In the preferred embodiment of the method of the invention, the relative amplitude of said variation of the multiplication factor has a predetermined value.

Implementation of the method is then fairly simple.

Advantageously, said relative amplitude is 0.5%.

BRIEF DESCRIPTION OF THE DRAWINGS

The present invention will be better understood from the following description of the preferred embodiment for implementing the method of the invention, with reference to the accompanying drawings in which.

DESCRIPTION OF THE PREFERRED EMBODIMENT

Figure 1:
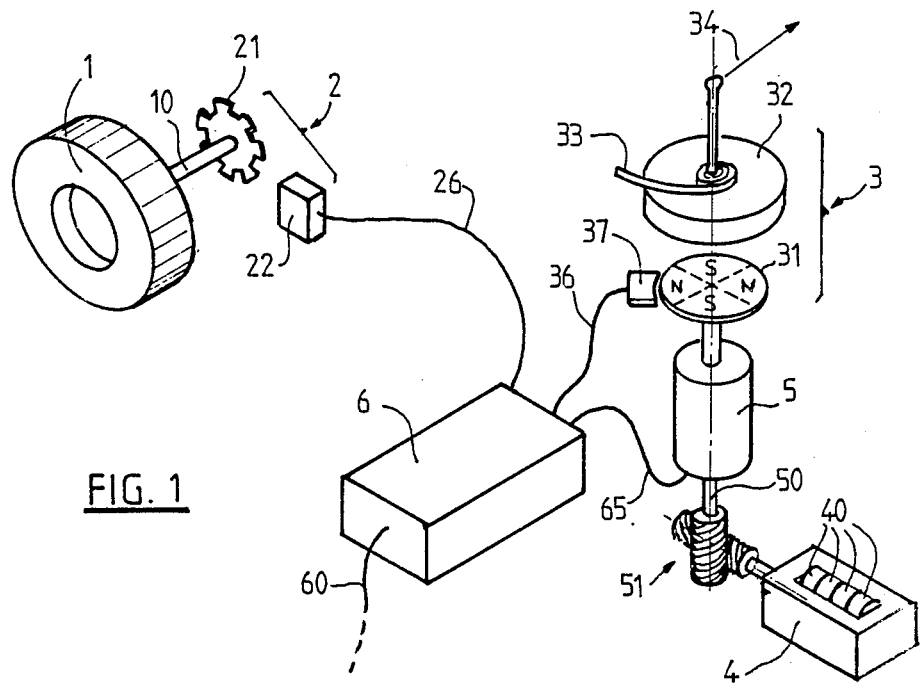
FIG. 1 shows a diagram of a speed sensor, a speedometer, a mileage recorder and an electronic device putting the method into practice, with which a motor vehicle is provided.

A motor vehicle, one wheel 1 of which is shown in FIG. 1, on board which the speed and distance covered are to be displayed, is provided for this purpose with a speed sensor 2 mounted on the shaft 10 of wheel 1, a speed indicator or display device 3 and a mileage recorder or totalizer 4.

An auxiliary electric motor 5 comprises a shaft 50 connected directly to the speed indicator 3 and, through an endless screw and helical wheel connection 51, to the mileage recorder 4.

An electronic servo control device 6 is connected electrically to the speed sensor by a connection 26, to the speed indicator by a connection 36 and to the auxiliary motor 5 by a connection 65.

The speed sensor 2, of known type, comprises a toothed wheel 21 made from a ferro magnetic material and a magneto-electric sensor 22 whose output is connected to the connection 26.

The speed indicator 3, of known type, comprises a permanent four pole magnet 31 mounted on shaft 50 which drives, through eddy currents, a plate or disk 32 integral with a needle 34 moving in front of a dial (not shown) disk 32 and needle 34 being returned by a return spring 33.

The mileage recorder 4 is of the known type comprising totalizing drums 40.

The auxiliary motor 5 is a DC electric motor.

A magneto-electric sensor 37 is placed in the vicinity of the permanent magnet 31. Its output is connected to connection 36.

The electronic servo control device 6, connected electrically by a connection 60 to the battery not shown of the vehicle, will now be described with reference to FIG. 2.

It includes a microprocessor 64, here a four bit microprocessor, whose two inputs 26' and 36' are connected to the connections 26 and 36 by means of two shaping circuits 62 and 63, of conventional type for shaping pulses.

An output 65' of the microprocessor 64 is connected, through a low pass filter 66 of the resistance and capacitor type, and an amplifier 67 of conventional type to connection 65.

Four inputs 68 of microprocessor 64 may be connected to ground by jumpers 69.

Conventionally, the microprocessor 64 is connected to a clock oscillator circuit 70 of the resistance and capacitor type.

Device 6 has finally an electric power supply circuit 61, of known type, for delivering to the circuit 62, 63, 70 and to the microprocessor 64, in a way not shown for the sake of simplification, the supply currents required for their operation, at a DC voltage here equal to 5V. The input of circuit 61 is connected to connection 60 as well as the electric power supply input of amplifier 67.

The operation of the above assembly will now be described with reference to FIG. 3 in so far as the operation of the microprocessor 64 is concerned.

When the motor vehicle is in operation, the rotation of wheel 1 controls the production, through the speed sensor 2, of a train of pulses. These pulses, after shaping in circuit 62, are applied to the input 26' of the microprocessor 64, adapted so as to determine the recurrence period T thereof (block 101).

The rotation of the shaft 50 of the auxiliary motor 5 controls the production, by the magneto-electric sensor 37 associated with the permanent magnet 31, of a train of pulses. These pulses, after shaping in circuit 62 are applied to the input 36' of the microprocessor 64, adapted for determining the recurrence period T' thereof (block 102).

The microprocessor 64 calculates (block 103) the product of the period T multiplied by a factor $K_M$ (block 205), such that:

$$K_M = K + \Delta K$$

In this expression, the term K is equal to the ratio between the number of pulses delivered by the speed sensor 2 when the vehicle has advanced a certain distance and the number of pulses delivered to the magnetoelectric sensor 37 when the indication of the mileage recorder 4 has increased by an amount corresponding to this same distance.

The term K, like the multiplication factor $K_M$, depends then on the development or size of wheel 1. The term $\Delta K$, whose relative size with respect to term K remains small, will be defined subsequently.

The microprocessor 64 also calculates (block 104) the difference $\epsilon_1$, such that:

$$\epsilon_1 = T' - K_M T$$

The microprocessor is adapted for delivering (block 105) to the terminal 65' a periodic binary signal whose cyclic ratio is proportional to $\epsilon_1$. Since the cyclic ratio is defined as the ratio between the time during which the signal is at the high level and the time during which it is at the low level, the low pass filter 66 delivers to the amplifier 67 a smoothed substantially constant signal whose amplitude is proportional to the difference $\epsilon_1$. Thus a rotational speed of the auxiliary motor 5 is ordered proportional to the difference $\epsilon_1$.

Figure 3:
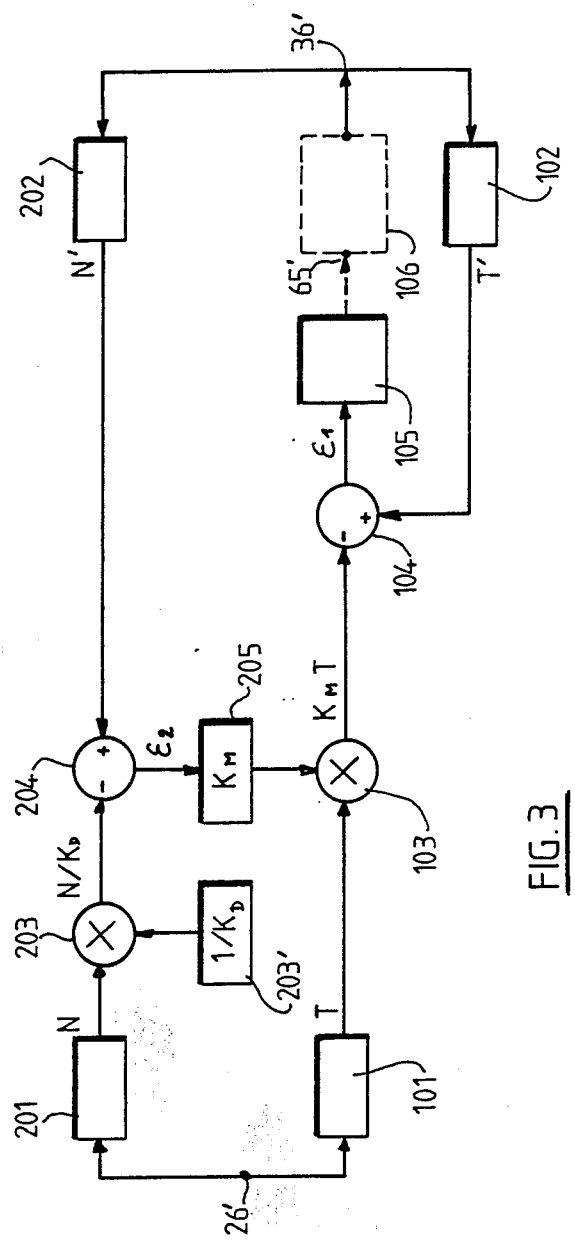
FIG. 3 shows a functional graph, relating to the operation of the microprocessor of FIG. 1.

In the FIG. 3, block 106 shows schematically the whole of the operations carried out by the low pass filter 66, the amplifier 67, the motor 5 as well as the permanent magnet 31 and the magneto-electric sensor 37 so as to form a first loop 102, 104, 105 and 106 for slaving the period T' related to the rotation of the auxiliary motor 5 to the period T related to the rotation of wheel 1.

Microprocessor 64 is adapted for counting the number of pulses controlled, from start up of the vehicle, by rotation of wheel 1 (block 201).

Microprocessor 64 is adapted for counting the number N' of pulses controlled, from start up of the vehicle, by rotation of the shaft 50 of the auxiliary motor 5 (block 202).

Periodically, and here every eight seconds, at times $t_0, t_1, \ldots, t_n, \ldots$, the microprocessor 64 calculates (block 203) the quotient of the number N divided by a factor $K_D$ (block 203'), so that:

$$K_D = K$$

The microprocessor 64 then calculates (block 204) the difference $\epsilon_2$, so that:

$$\epsilon_2 = N' - N/K_D$$

and it is adapted for calculating (block 205) the term $\Delta K$ at the time $t_n$, i.e. $\Delta K(t_n)$ so that:

$$\Delta K(t_n) = \Delta K(t_{n-1}) + \Delta K_o(\epsilon_2)$$

In this expression, the relative amplitude $\Delta K_o/K_M$ of the term $\Delta K_o(\epsilon_2)$
is equal to +0.5% if the difference $\epsilon_2$ is positive, or is equal to −0.5% if the difference $\epsilon_2$ is negative.

The numbers N and N' are stored in the microprocessor 64 in registers R and R'. These registers, here 12 bit registers, and in the case where the speed sensor 2 and the magneto-electric sensor 37 both deliver a few pulses per meter covered, have a capacity Q such that they may be filled after a distance travelled of the order of 10 to 20 km.

So that this situation does not arise, at each instant of the series $t_0, t_1, \ldots t_n, \ldots$, the microprocessor 64 compares the contents of each of the registers R and R' with a corresponding threshold, here to a fraction equal to 15/16 of their total capacity Q. As soon as the contents of one of the registers is greater than this threshold, we find one of the following cases:

(1) in the case where it is the contents of register R' which has crossed the threshold, the microprocessor 64 calculates $N_o$ so that:

$$N_o = (N - KN')_{modulo\ Q}$$

it resets the register R' and loads $N_o$ into the register R.

(2) in the case where the contents of register R has crossed the threshold, the microprocessor 64 calculates $N'_o$ so that:

$$N'_o = (N' - N/K)_{modulo\ Q}$$

it resets the register R and loads $N'_o$ into the register R'.

Figure 2:
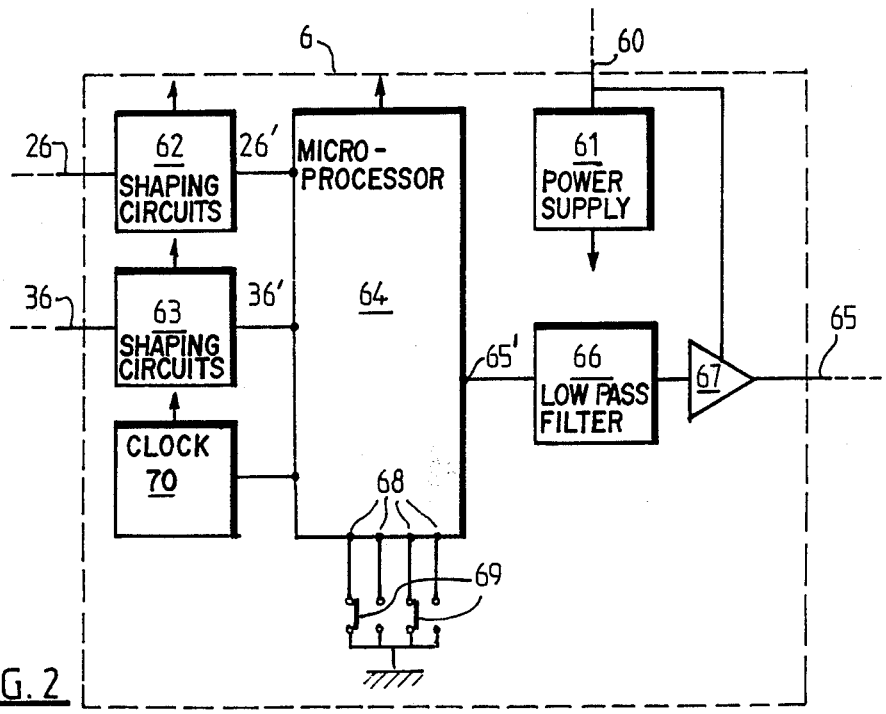
FIG. 2 shows a block diagram of the electronic device of FIG. 2.

Conventionally, as shown in FIG. 2, the value of term K may be programmed by acting on the jumpers 69 which here allow 16 different values of K to be programmed so that the device may be suitable for any type of vehicle.

In the description which has just been made, the rotational speeds of wheel 1 and of the shaft 50 of motor 5 are determined by means of magneto-electric sensors 22 and 37 of a conventional type. They may be replaced in particular by optoelectronic sensors and, in general, by any device putting into practice a known method of measuring the rotational speed of a shaft or of a motor.

The operation shown schematically by the blocks of FIG. 3 and carried out by the microprocessor 64 in the above description, may also be provided by a succession of discrete circuits such as counters, period meters, subtractors, multipliers, ... of known type.

What is claimed is:

1. A method of displaying the speed and the distance on board a motor vehicle, said method comprising:
  (a) determining a first period of recurrence of a train of pulses generated by a speed sensor responsive to a speed of rotation of one of the wheels of the vehicle,
  (b) determining a second period of recurrence of a train of pulses generated by a speed sensor responsive to a speed of rotation of a shaft of an auxiliary motor connected to a display device displaying a rotational speed of said shaft and to a totalizer totalizing a number of revolutions of said shaft during a period of driving of the vehicle,
  (c) multiplying said first period by a multiplication factor which depends upon the size of said wheel to obtain a multiplication product,
  (d) determining an arithmetical difference between said second period and said product,
  (e) controlling a speed of rotation of said shaft of said auxiliary motor so that said speed is proportional to said difference between said second period and said product,
  (f) counting a first number of said pulses generated responsive to rotation of said wheel from start up of the vehicle,
  (g) counting a second member of said pulses generated responsive to rotation of said shaft of the auxiliary motor from start up of the vehicle,
  (h) periodically determining a quotient of said first number divided by a factor which depends on the size of said wheel,
  (i) determining an arithmetical difference between said second number and said quotient, and
  (j) obtaining a variation factor of said multiplication factor which has a same sign (positive or negative) as said difference between said second number and said quotient.

2. The method as claimed in claim 1, wherein a relative amplitude of said variation factor of said multiplication factor relative to said multiplication factor has a predetermined value.

3. The method as claimed in claim 2, wherein said relative amplitude is 0.5%.

4. The method as claimed in claim 1, wherein said multiplication factor is equal to a sum of (a) a ratio between (i) a number of pulses generated responsive to rotation of said wheel when the vehicle has advanced a given distance and (ii) a number of pulses generated responsive to rotation of said shaft of said auxiliary motor when said totalizer has increased by an amount corresponding to said given distance and (b) said variation factor.

* * * * *

UNITED STATES PATENT AND TRADEMARK OFFICE
CERTIFICATE OF CORRECTION

PATENT NO. : 4,796,210

DATED : January 3, 1989

INVENTOR(S) : Georges DUBUISSON, et al.

It is certified that error appears in the above-identified patent and that said Letters Patent is hereby corrected as shown below:

Column 2, line 57, after "Fig" change "2" to --1--.
Column 2, line 59, after "Fig" change "1" to --2--.
Column 3, line 51, change "in so far" to --insofar--.
Column 3, line 62, after "circuit" change "62" to --63--.
Column 4, line 6, after "delivered" change "to" to --by--.
Column 4, line 17, after "=" change "T" to --T'--.

In Fig. 3, please label Box "201" to read --Count of Number N Of Pulses of Train On Input 26'--.
In Fig. 3, please label Box "101" to read --Determination of Period T Of Train On Input 26'--.
In Fig. 3, please label Box "105" to read --Generation Of A Signal Of Cyclic Ratio Proportional To $E_1$--.
In Fig. 3, please label Box "202" to read --Count Of Number N' Of Pulses Of Train On Input 36'--.
In Fig. 3, please label Box "102" to read --Determination Of Period T' Of Train On Input 36'--.
In Fig. 3, please label Box "203'" to read --Storage of $1/K_D$--.
In Fig. 3, please label Box "205" to read --Calculation of $K_M$--.

Signed and Sealed this

Eighth Day of January, 1991

Attest:

HARRY F. MANBECK. JR.

*Attesting Officer*   *Commissioner of Patents and Trademarks*